Dec. 13, 1966   W. R. SWOISH ET AL   3,292,048
PROTECTED ELECTRICAL TRANSFORMER
Filed Oct. 20, 1964   5 Sheets-Sheet 2

INVENTORS.
WILLIAM R. SWOISH
JOHN R. SMITH
BY Lee H. Kaiser
Attorney

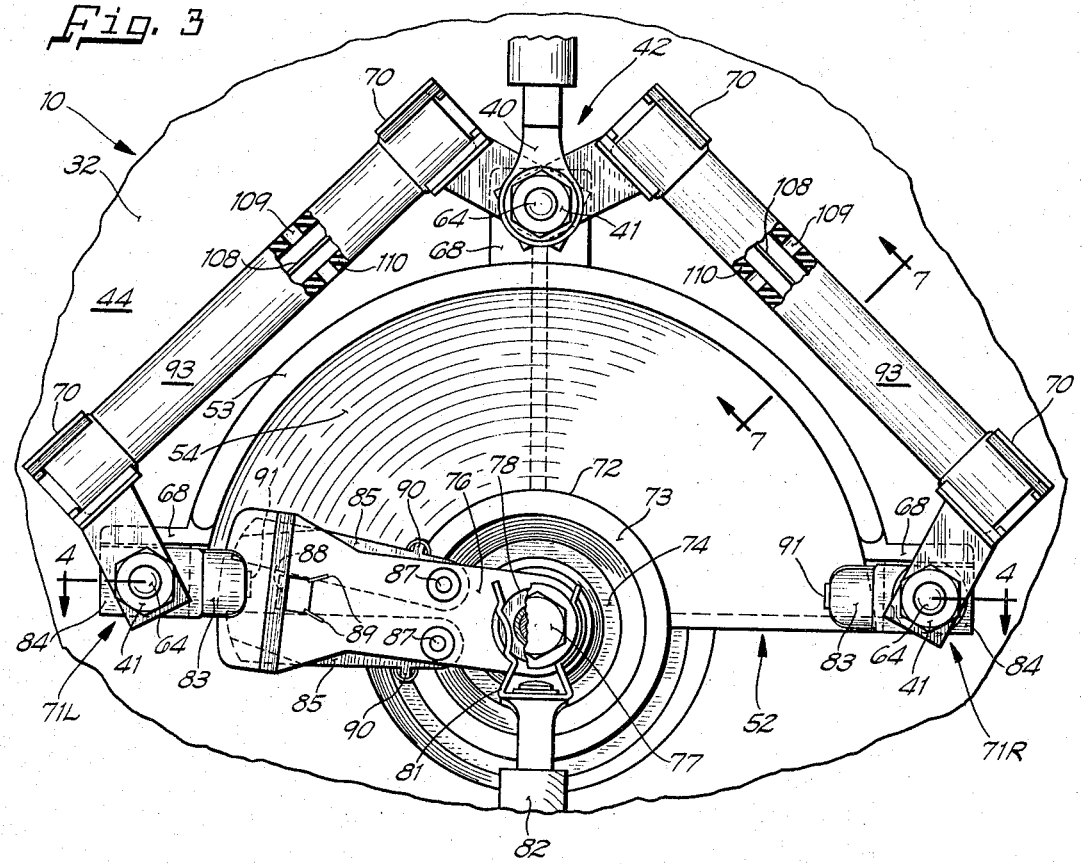
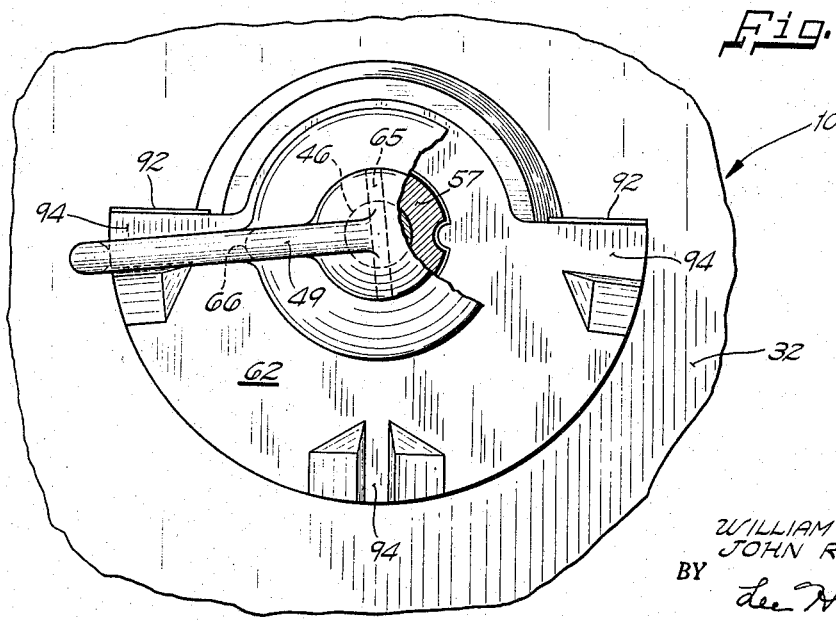

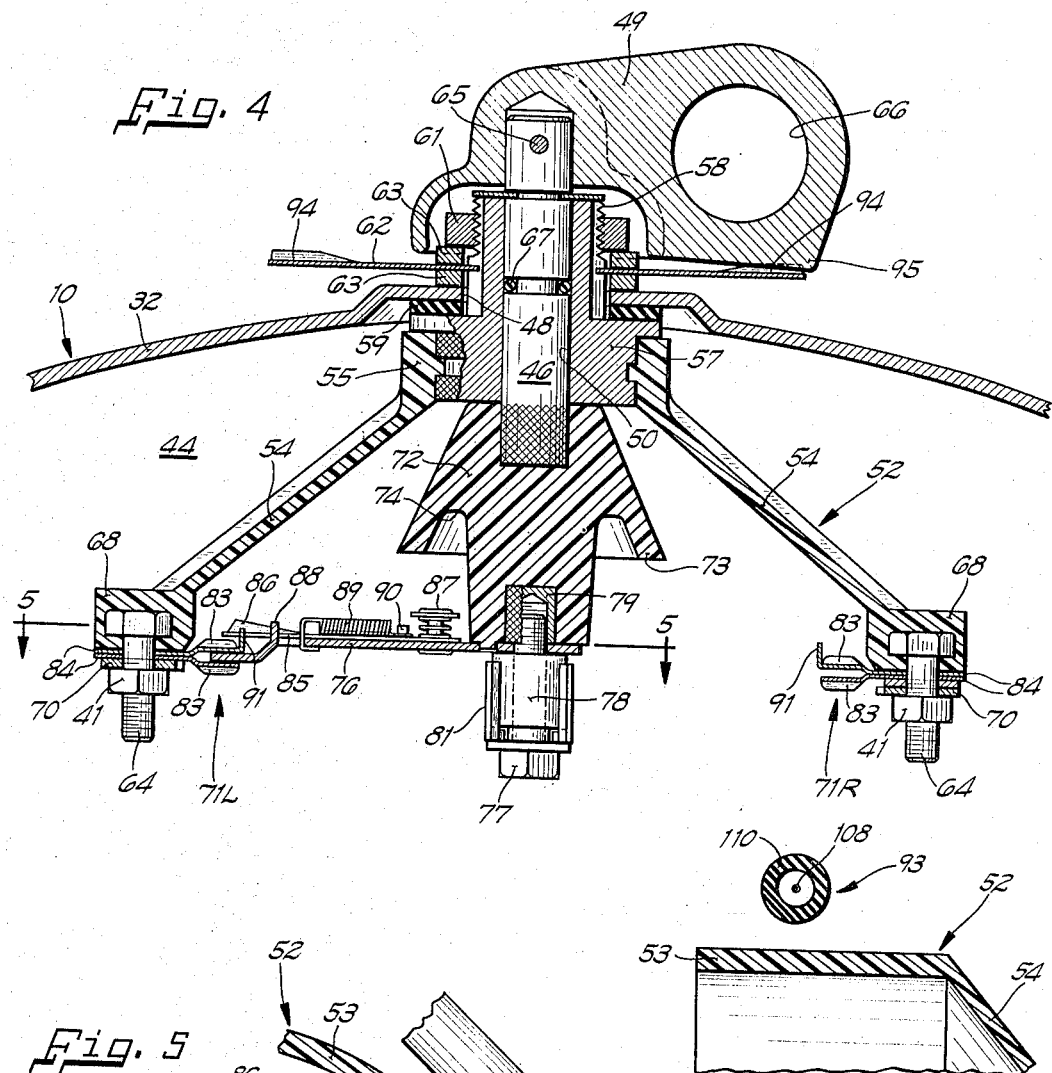

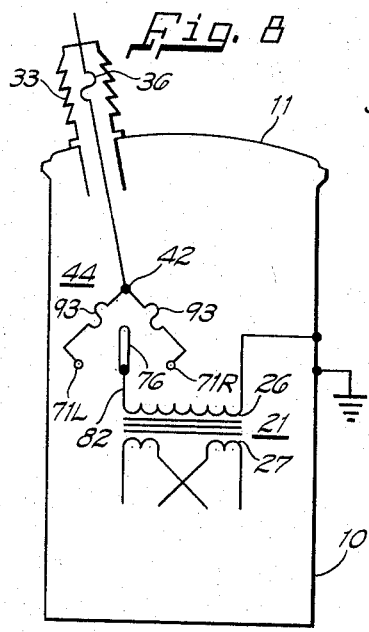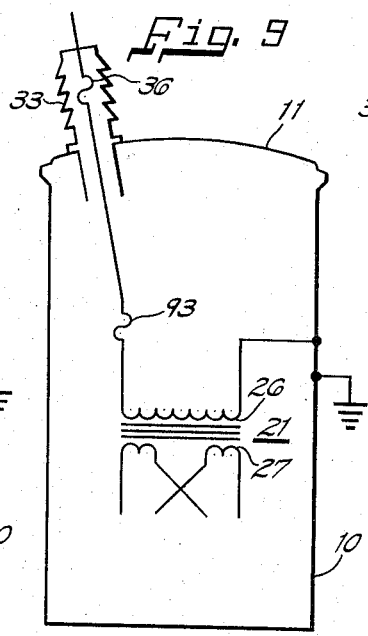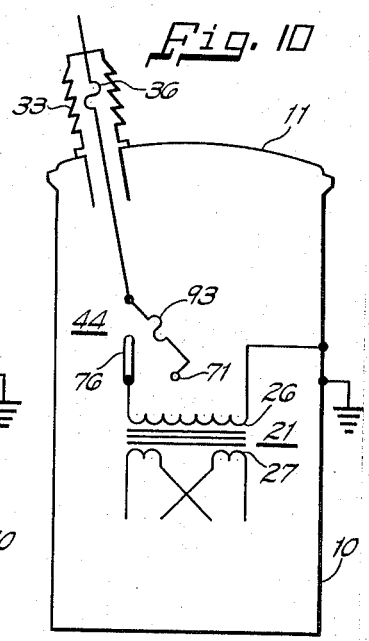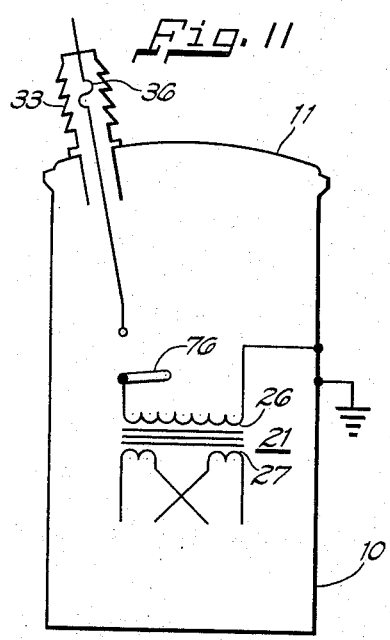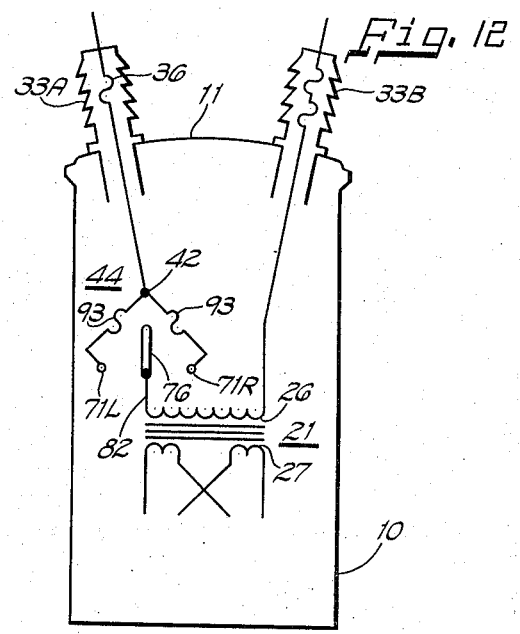

United States Patent Office  3,292,048
Patented Dec. 13, 1966

3,292,048
PROTECTED ELECTRICAL TRANSFORMER
William R. Swoish, Pittsburgh, and John R. Smith, McMurray, Pa., assignors to McGraw-Edison Company, Milwaukee, Wis., a corporation of Delaware
Filed Oct. 20, 1964, Ser. No. 405,058
12 Claims. (Cl. 317—15)

This invention relates to the protection of electrical distribution transformers against currents of both overload and short circuit proportions.

Electrical distribution transformers are conventionally protected by either: (1) A fuse link in series with the primary winding, or (2) the combination of a primary fuse link and a secondary circuit breaker coordinated with the primary link so that the fuse link operates in response to high magnitude fault currents resulting from failure within the transformer and the breaker opens the secondary circuit in response to overload current. The high cost of the latter has limited its use to a small percentage of transformers. In either arrangement the primary fuse is incapable of interrupting high magnitude short circuit currents which trip a backup device such as a sectionalizer, recloser, or substation circuit breaker, in order to clear the circuit. The mounting of the primary link in a fuse cutout adds materially to the cost of the power distribution system, and in certain transformers the primary links are immersed in the oil within the transformer casing. Replacement of known internally mounted primary fuse links is exceptionally difficult in that the lineman on the power pole must reach with both arms through the hand hole in the casing cover in order to prevent the fuse mounting nut from dropping into the oil.

The casings of distribution transformers in the past have been provided with gaskets that dried out and took a permanent set after weathering for a few years and permitted the casing to "breathe" when dangerous overpressures developed within the casing. The nitrile gaskets introduced in recent years for transformer casings do not dry out or take a permanent set with the result that the transformer casing can retain internal pressure indefinitely. The pole mounted transformer tank provided with such nitrile gasket constitutes a potential "bomb" which can burst due to excessive internal pressure and shower hot oil, thus constituting a safety hazard to linemen. Dangerous overpressures within the transformer casing can result from incipient faults of too small current magnitude to cause operation of the primary link or of the secondary breaker by $I^2R$ heating. Such relatively low magnitude fault currents may persist for a substantial period of time and heat the oil until the internal pressure is sufficient to burst the casing.

It is an object of the invention to provide an electrical distribution transformer protected by means capable of interrupting short circuit current on the circuit including the primary transformer winding without tripping a backup device and of limiting the current to a magnitude less than the available short circuit current of the circuit. It is a further object to provide an electrical distribution transformer protected by means capable of interrupting: (1) Short-circuit current in the circuit including the primary winding, (2) relatively low magnitude overload current, and (3) incipient fault current which may persist for a sufficiently long time to build up excessive pressure within the casing. Another object of the invention is to provide an electrical distribution transformer protected by means capable of interrupting short circuit, low magnitude overload, and incipient fault current and also having load break switch means operable from the exterior of the transformer casing and capable of interrupting load and exciting current to permit changeout of the transformer. Still another object is to provide an electrical distribution transformer protected by means capable of interrupting short circuit, relatively low magnitude overload, and incipient fault current and also having manually operable means accessible from the exterior of the casing for re-fusing the transformer. Another object of the invention is to provide an electrical distribution transformer protected by a current limiting fuse capable of interrupting short circuit current and by an overload fuse capable of interrupting low magnitude overload and incipient fault current and having a second overload fuse which may be of increased rating and switch means for connecting the primary winding to the second overload fuse after an outage in order to determine whether disconnection of the transformer was caused by overload or short circuit and to permit temporary overload prior to changeout of the transformer. Another object is to provide such an electrical distribution transformer wherein the overload fuses are detachably mounted within the casing in a position where they are readily accessible through the hand hole and may easily be replaced by the lineman without tools and by using one hand.

These and other objects and advantages of the invention will be more readily apparent from the following detailed description when taken in conjunction with the accompanying drawing wherein:

FIG. 3 is an enlarged elevation view of the load break switch mounted internally of the transformer of FIG. 1;

FIG. 4 is a view taken on lines 4—4 of FIG. 3;

FIG. 5 is a view taken on lines 5—5 of FIG. 4;

FIG. 6 is an elevation view of means external of the transformer casing for operating the load break switch;

FIG. 7 is a partial sectional view taken on line 7—7 of FIG. 3;

FIG. 8 is a schematic circuit diagram of the embodiment of FIGS. 1–7;

FIGS. 9–12 are schematic circuit diagrams of alternative embodiments of the invention.

Figure 1:
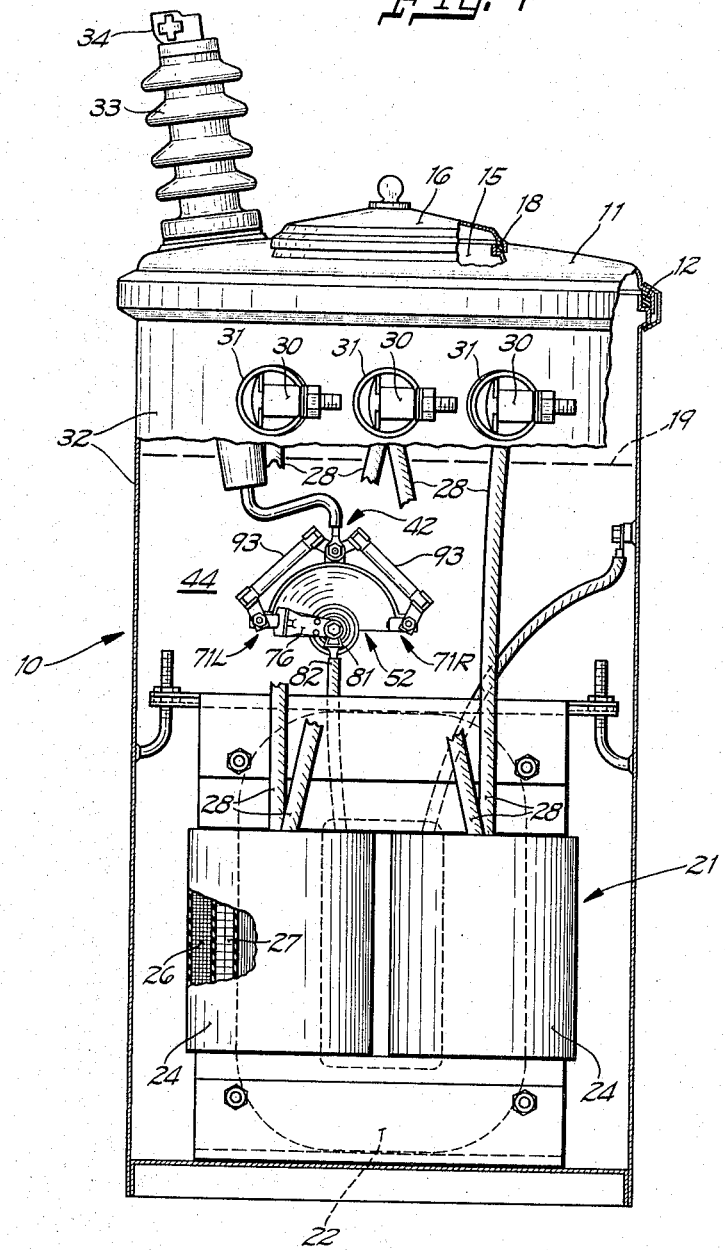
FIG. 1 is a view of a distribution transformer embodying the invention with a portion of the casing broken away to illustrate the internal construction.
Figure 2:
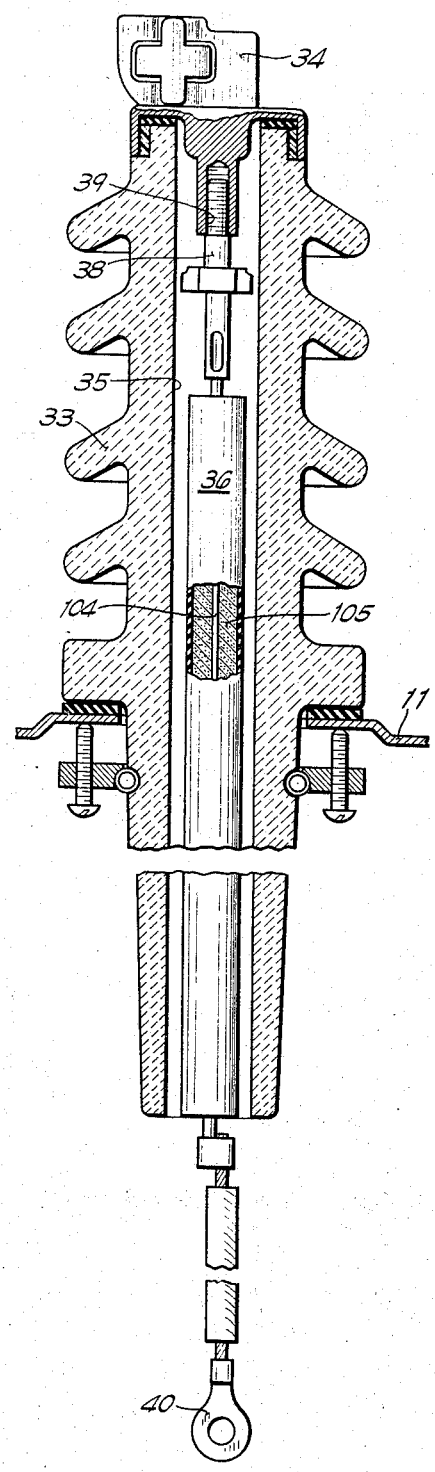
FIG. 2 is a view through the primary bushing of the transformer of FIG. 1 and showing the mounting of the current limiting fuse.

Referring to the drawing, an electrical distribution transformer embodying the invention may include a generally cylindrical metallic casing 10 adapted to be mounted on a power pole and closed by a metallic cover 11 with a resilient nitrile gasket 12 compressed therebetween to hermetically seal the casing. Cover 12 is provided with a hand hole 15 affording access to the interior of casing 10, and hand hole 15 is closed by a hand hole cover 16 with a resilient nitrile gasket 18 compressed therebetween to provide a hermetic seal. Casing 10 contains an insulating dielectric fluid 19 such as transformer oil. A transformer core and coil assembly 21 immersed in the oil 19 within the casing 10 includes a closed magnetic core 22 having a pair of winding legs embraced by coils 24 each of which may include a winding section of a primary winding 26 and a winding section of a secondary winding 27, and the winding sections in the two coils 24 may be connected in series or in parallel to form the transformer primary and secondary windings. One end of the primary winding 26 of the embodiment illustrated in FIGS. 1–8 may be electrically connected to the grounded metallic casing 10 as shown in FIGS. 1 and 8. Leads 28 from secondary winding 27 are connected to central conductor studs 30 extending through secondary insulating bushings 31 affixed to the sidewall 32 of casing 10. A primary insulating bushing 33 mounted on cover 11 has a conductor stud 34 extending therethrough into an axial bore 35 within bushing 33. The shank of primary bushing 33 is immersed in dielectric fluid 19, and a current limiting fuse 36 is positioned in axial bore 35 and has a threaded connector member 38 at one end engaged within a tapped aperture 39 in conductor stud 34. Current limiting fuse 36 will be described in detail hereinafter. The other end of current limiting fuse 36 may terminate in a metallic eye member 40 clamped by nut 41 to one terminal 42 of a unitary fuse-switch assembly including a three position load break switch 44 mounted on a casing sidewall 32 and immersed in the oil 19 and having a rotatable operating shaft 46 extending through an aperture 48 in sidewall 32 and terminating in a handle 49 accessible from the exterior of the casing 10 for actuating the switch 44.

Switch shaft 46 extends through an axial aperture 50 (see FIG. 4) in a molded insulating support member 52 having a semi-cylindrical portion 53 joined by a generally conical portion 54 to a smaller diameter cylindrical portion 55 in which a generally tubular metallic hub 57 is embedded. Hub 57 has an externally threaded smaller diameter portion 58 which extends through aperture 48 in casing sidewall 32 and is clamped against sidewall 32 with a resilient gasket 59 compressed therebetween by a conduit nut 61 engaging the threaded portion 58 external of casing sidewall 32 to rigidly affix support member 52 to casing sidewall 32. A position index plate 62 has an aperture therein which receives shaft 46 and is clamped between conduit nut 61 and casing sidewall 32 with a pair of washers 63 disposed on opposite sides of index plate 62. Index plate 62 has a depending portion disposed opposite handle 49 and bearing suitable indicia for visually indicating the position to which switch 44 is operated. Handle 49 is affixed to shaft 46 by a pin 65 and has an eye 66 to permit operation of the switch by means of a hookstick. A resilient O-ring gasket 67 compressed within a circumferential groove in switch shaft 46 provides a hermetic seal between shaft 46 and support member 50 to prevent leakage of oil from casing 10.

Support member 52 has three radially extending projections 68 spaced ninety degrees apart about the periphery of semicylindrical portion 53. An axially extending bolt 64 is embedded in each projection 68 of molded support member 52. The bolt 64 on the central projection 68 is part of switch terminal 42 and extends through eye 40 on the lead from the current limiting fuse 36 and is engaged by nut 41. A pair of clip connectors 70 adapted to detachably engage the metallic ferrules on a pair of overload fuses 93 have apertures which receive bolt 64 on central projection 68, and clip connectors 70 are clamped on bolt 64 by nut 41. The bolts 64 on the outer two projections 68 extend through apertures in radially inward extending stationary switch contacts 71 and also through apertures in clip connectors 70 adapted to detachably engage the metallic ferrules on the other end of fuses 93. The stationary contacts 71 and connectors 70 are clamped in position on support member 52 by nuts 41 threaded on the bolts 64.

One end of shaft 46 is embedded within a molded insulating member 72 having an outwardly flaring portion 73 and a re-entrant portion 74 to increase creepage distance in an axial direction. A main contact 76 of suitable high conductivity material such as copper is affixed to switch shaft 46 by a bolt 77 which extends through the axial bore in a sleeve connector member 78 of suitable high conductivity material such as copper and through an aperture in main contact 76 and engages internal threads in a metallic insert 79 embedded in the molded insulating member 72 to clamp main contact 76 against insulating member 72. A metallic clip terminal 81 resiliently engages sleeve connector 78 and constitutes the second terminal for the unitary switch-fuse assembly and carries a connector in which a primary lead 82 from the transformer primary winding 26 is crimped. Main contact 76 rotates with shaft 46 between first and second positions wherein it engages the stationary contacts 71L and 71R respectively and a third "open" position between the first and second positions wherein it is disengaged from the stationary contacts 71L and 71R. Each stationary contact 71 comprises a pair of thin juxtaposed members 84 of suitable high conductivity material such as copper having opposed offset portions 83 which converge in an arcuate direction to facilitate entry of the main contact 76 between members 84 and provide high contact engagement therewith. A pair of elongated arcing contacts 85 of suitable high conductivity material such as copper are pivotally mounted on pins 87 carried on main contact 76 away from the axis thereof and are resiliently urged against a boss 88 on main contact 76 by tension springs 89 having hook-shaped ends which respectively engage an upstanding ear 90 on the arcing contact 85 and extend through an aperture in the main contact 76. Each stationary contact 71 has a lug 91 extending parallel to the axis of shaft 46 which latches the corresponding arcing contact 85 against movement when main contact 76 is actuated by handle 49 into the first and second positions in engagement with the stationary contacts 71L and 71R respectively. Each arcing contact 85 has a portion 86 bent up at an acute angle thereto which facilitates lifting the arcing contact 85 over lug 91 as the main contact 76 is rotated into the first and second positions. Arcing contact 85 remains latched in engagement with stationary contact 71, as main contact 76 is rotated by shaft handle 49 from the first or second to the third position, until main contact 76 has separated a substantial distance from stationary contact 71, at which time arcing contact 85 is disengaged from lug 91 and snaps under the force of spring 89 into parallelism with main contact 76, thereby breaking any arc which may be formed between stationary contact 71 and main contact when interrupting exciting or load current to the transformer.

Peripherally spaced apart, radially extending stop ribs 92 on position index plate 62 prevent rotation of handle 49 and main contact 76 beyond the first and second positions in engagement with stationary contacts 71. Position index plate 62 has peripherally spaced apart, radially extending depressions 94 therein which cooperate with and receive a radial arm 95 on handle 49 to releasably hold handle 49 and switch 44 in the first, second and third positions.

A pair of overload fuses 93 are mounted so that one ferrule of each fuse engages clip connector 70 on the middle projection 68 and the other ferrule thereon engages clip connector 70 on one of the end projections 68. The clip connectors 70 releasably engage the fuses 93 and are readily accessible through the hand hole 15 and permit the lineman on a power pole to easily replace a fuse 93 using only one hand and without unthreading mounting nuts for the fuses. Load break switch 44 can be operated by a hookstick engaging eye 66 in handle 49 and can alternately connect the transformer primary winding 26 to the power line through either of the two thermal overload fuses 93, when the switch 44 is in the first and second positions, and can disconnect the primary winding 26 from the power line when the switch is actuated to the third "open" position between the stationary contacts 71, thereby interrupting both load and/or excitation current to the transformer prior to changeout. Load break switch 44 is capable of carrying overload current in excess of 90 amperes at 15,000 volts continuously and can carry short circuit current in excess of 2700 amperes for two seconds. Further, load break switch 44 provided with arcing contacts 85 is capable of interrupting 90 amperes at 90 percent power factor at 15,000 volts when being actuated from the first or second to the "open" position.

Load break switch 44 interrupts either load and/or exciting current to the transformer primary winding 26 to permit changeout of the transformer. In the event that the transformer has been disconnected from the power line by operation of the current limiting fuse 36 or one overload fuse 93, the load break switch 44 permits operation of main contact 76 into engagement with the other stationary contact 71 in order to determine whether the outage was caused by a current of overload or of short circuit magnitude. If the outage was caused by an overload current which operated one thermal fuse 93, the transformer will again be energized when switch 44 is operated to connect the second overload fuse 93 in series with the transformer primary winding 26, whereas if the outage was caused by operation of current limiting fuse 36, the transformer will not be energized when switch 44 is operated to connect the second overload fuse 93 in series with primary winding 26. If the second fuse 93 is of higher rating than the fuse 93 which blew on overload current, operation of switch 44 to connect the second fuse in series with primary winding 26 will permit temporary or emergency operation of the transformer under overload conditions prior to changeout of the transformer.

Current limiting fuse 36 has a fusible element 104 in the form of one or more thin conductors of silver embedded in a granular inert material 105 of high dielectric strength such as sand or finely divided quartz. When subjected to fault current of greater than approximately 30 times 100 percent load current on the transformer as shown by the portion A of the composite time-current characteristic for the current limiting fuse 36 and overload fuse 93 illustrated in FIG. 13, the fusible element 104 attains fusing temperatures and vaporizes within less than five seconds, in accordance with the time-current characteristic, and interrupts short-circuit of up to 18,000 asymmetrical amperes on the power line circuit including the transformer winding 26. The metal vapors expand rapidly to many times the volume originally occupied by the fusible element 104 and are thrown between granules of inert filler material where they condense and are no longer available for current conduction. The current limiting effect results from the interaction of the metal vapors and the inert granular material 105 surrounding the fusible element 104. The physical contact between the hot arc and the relatively cool granules causes a rapid transfer of heat from the arc to the granules, thereby dissipating most of the arc energy with very little pressure buildup within the fuse casing. Consequently, a high resistance is, in effect, inserted into the path of the current and limits the current in the circuit including primary winding 26 to a magnitude which is only a small fraction of that available in the circuit and results in rapid decay of current and subsequent interruption of currents greater than approximately 300 amperes in intervals less than half a cycle with negligible generation of gas and noise.

Figure 13:
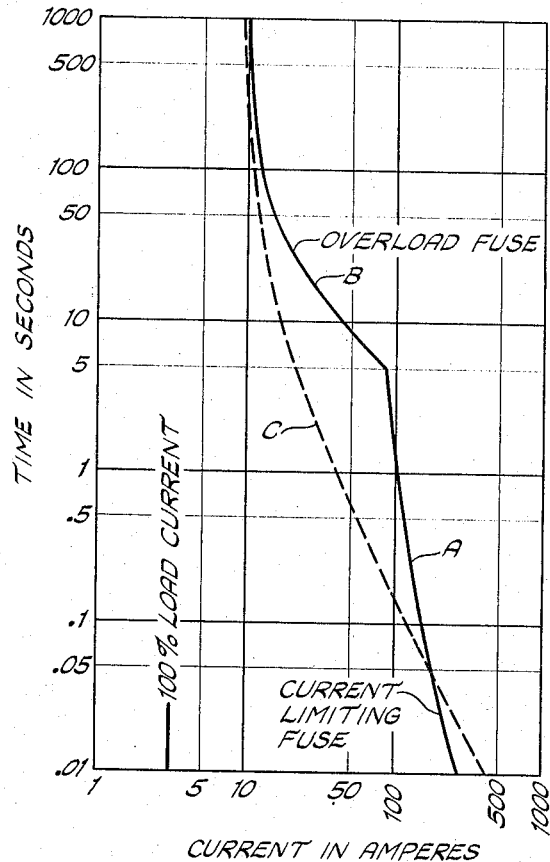
FIG. 13 is a typical composite time-current characteristic for the transformer protective means.

The overload fuse 93 is of the thermal type which will interrupt up to 500 amperes in accordance with portion B of the time-current characteristic of FIG. 13. Overload fuse 93 has a low melting temperature element 108 fusible in a time interval generally greater than five seconds in response to $I^2R$ heating caused by overload current of a magnitude between approximately 3 and 30 times 100 percent load current on the transformer, and the primary purpose of fuse 93 is to protect the transformer from damage due to low magnitude fault currents. The fusible element 108 of overload fuse 93 is exposed to the hot transformer oil through apertures 109 in outer fuse casing 110 and has a melting temperature of approximately 135° C. Overload fuse 93 is fusible in response to $I^2R$ heating of element 108 and overheating of the oil 19 caused by incipient fault currents within the transformer which are of insufficient magnitude to melt the element 108 by $I^2R$ heating alone. Such incipient fault currents may persist for hours and days without melting a conventional primary fuse link and heat the oil 19 and build up pressure within the casing 10 to the point where the casing becomes a potential "bomb" on the pole which can burst and shower hot oil on operating personnel and thus constitutes a safety hazard. Low melting temperature fusible element 108 is responsive to the heat of the oil and melts in response to heating of the oil by incipient fault currents in the range below approximately 3 times 100 percent load current, which are insufficient to rupture the element 108 by $I^2R$ heating only, before sufficient internal pressure is built up within casing 10 to rupture the casing.

It will be noted that the composite time-current characteristic A–B for current limiting fuse 36 and overload fuse 93 shown in FIG. 13 provide approximately the same protection as that obtained by a combination of conventional primary fuse link and secondary breaker, shown by dotted line C in FIG. 13, and in addition the disclosed protective means is responsive to incipient fault currents which may build up sufficient overpressure to rupture the casing and also responsive to short circuit fault currents which in conventional arrangements can only be interrupted by the tripping of a backup device such as a sectionalizer, recloser, or substation circuit breaker.

FIG. 8 shows the schematic circuit diagram for the preferred embodiment of the invention illustrated in FIGS. 1–7 and 13. In the alternative embodiment illustrated in FIG. 9, the load-break switch is eliminated and the transformer is protected by the series arrangement of current limiting fuse 36 and overload fuse 93, and it will be understood that the overload fuse 93 in this embodiment will also be detachably mounted in clip connectors 70 permitting fuse replacement by the lineman on the pole using only one hand. The embodiment of FIG. 10 utilizes a load break switch 44 for interrupting load current and/or exciting current to permit changeout of the transformer, but this embodiment utilizes only a single overload fuse 93 and the transformer cannot be re-fused by operation of the load-break switch. FIG. 11 illustrates an embodiment of the invention wherein the transformer is protected by current limiting fuse 36 against high magnitude fault currents of greater than approximately 30 times 100 percent load current but embodies no protection against fault currents of overload proportions. FIG. 12 illustrates an embodiment wherein one end of the primary winding 26 is not grounded as in the preferred embodiment and the transformer has two primary insulating bushings 33A and 33B on cover 11 both of which enclose a current limiting fuse 36 in a lead from the primary winding 26. It will be appreciated, however, that the fuse in insulating bushing 33B can alternately be of the overload type, of the current limiting type, or of the dual-element type in accordance with the protection desired by the utility.

Although only a few embodiments of the invention have been illustrated and described, many modifications and variations thereof will be readily apparent to those skilled in the art, and consequently it is intended in the appended claims to cover all such modifications and variations which fall within the true spirit and scope of the invention.

We claim:

1. A protected electrical distribution transformer comprising, in combination, a hollow casing having a hand hole therein permitting access to the interior of said casing, means including a detachable cover for sealing said hand hole, insulating dielectric fluid within said casing, a core and coil assembly including a magnetic core linked by transformer primary and secondary windings immersed in said fluid within said casing, an insulating bushing on said casing having a central conductor and an axial bore opening into the interior of said casing, a primary current limiting fuse within said bore electrically connected at one end to said central conductor, a primary overload fuse immersed in said fluid within said casing, means within said casing accessible through said hand hole for releasably mounting said primary overload fuse immersed in said fluid and including a pair of spaced apart terminals adapted to be electrically connected by said overload fuse, one of said terminals being connected to the other end of said current limiting fuse and the second of said terminals being electrically connected to one end of said primary winding, said current limiting fuse being adapted to interrupt short circuit current of the circuit including said primary winding and to limit the current to a magnitude smaller than the available short circuit current of said circuit and being adapted to rupture within less than five seconds on high amperage, short circuit currents greater than approximately 30 times 100 percent load current on said primary winding, said overload fuse having a low melting temperature element fusible in a time interval greater than five seconds in response to $I^2R$ heating caused by overload currents of a magnitude between approximately 3 and 30 times said 100 percent load current and also being fusible in response to $I^2R$ heating and overheating of said insulating fluid caused by incipient fault current of greater than ten minutes duration and less than approximately 3 times said 100 percent load current.

2. A protected electrical distribution transformer comprising, in combination, a hollow casing, insulating dielectric fluid within said casing, a core and coil assembly including a magnetic core linked by transformer primary and secondary windings immersed in said fluid within said casing, a primary insulating bushing on said casing having a central conductor and an axial bore therein, a current limiting fuse within said axial bore connected at one end to said central conductor, an overload fuse immersed in said insulating fluid within said casing, a load break switch immersed in said insulating fluid within said casing and having an operating member extending through a wall of said casing permitting operation of said switch from the exterior of said casing, said load break switch being conducted in series with said current limiting fuse and said overload fuse and said primary winding and being adapted to interrupt exciting and 100 percent load current to said primary winding, said current limiting fuse being adapted to interrupt short circuit current of the circuit including said primary winding and to limit the current to a magnitude smaller than the available short circuit current of said circuit.

3. A protected electrical distribution transformer comprising, in combination, a hollow casing, insulating dielectric fluid within said casing, a core and coil assembly including a magnetic core linked by transformer primary and secondary windings immersed in said fluid within said casing, a primary insulating bushing on said casing having a central conductor, a current limiting fuse within said casing connected at one end to said central conductor, an overload fuse immersed in said insulating fluid within said casing, a load break switch immersed in said insulating fluid within said casing and having an operating member extending through a wall of said casing permitting operation of said switch from the exterior of said casing, said load break switch being connected in series with said current limiting fuse and said overload fuse and said primary winding and being adapted to interrupt exciting and 100 percent load current to said primary winding, said current limiting fuse being adapted to interrupt exciting and 100 percent load current to said primary winding, said current limiting fuse being adapted to interrupt short circuit current of the circuit including said primary winding and to limit the current to a magnitude smaller than the available short circuit current of said circuit and being adapted to rupture within less than five seconds on high amperage, short circuit currents greater than approximately 30 times 100 percent load current on said primary winding, said overload fuse having a low melting temperature element fusible in a time interval greater than five seconds in response to $I^2R$ heating caused by overload currents of a magnitude between approximately 3 and 30 times said 100 percent load current and also being fusible in response to $I^2R$ heating and overheating of said insulating fluid caused by incipient fault current of greater than approximately ten minutes duration and less than approximately 3 times said 100 percent load current.

4. A protected electrical distribution transformer comprising, in combination, a hollow casing, insulating dielectric fluid within said casing, a core and coil assembly including a magnetic core linked by primary and secondary windings immersed in said fluid within said casing, a primary insulating bushing on said casing having a central conductor, a current limiting fuse within said casing connected at one end to said central conductor, an overload fuse, means for releasably mounting said overload fuse immersed in said fluid within said casing, a load break switch connected in series with said current limiting fuse and said overload fuse and said primary winding and immersed in said fluid within said casing and including a stationary contact, a movable contact, an operating member extending through a wall of said casing and permitting operation of said movable contact into and out of engagement with said stationary contact from the exterior of said casing, an arcing contact pivotally mounted on said movable contact and adapted to engage said stationary contact and remain in engagement therewith until said movable contact is actuated a predetermined distance away from said stationary contact by said operating member, and spring means for resiliently urging said arcing contact toward said movable contact; said load break switch being capable of interrupting approximately 30 times 100 percent load current on said primary winding at 90 percent power factor at 15,000 volts, said current limiting fuse being adapted to interrupt short circuit current of the circuit including said primary winding and to limit the current to a magnitude smaller than the available fault current of said circuit.

5. A protected electrical distribution transformer comprising, in combination, a hollow casing having a hand hole therein, insulating dielectric fluid within said casing, a core and coil assembly including a magnetic core linked by primary and secondary windings immersed in said fluid within said casing, a primary insulating bushing on said casing having a central conductor, a current limiting fuse mounted within said casing and connected at one end to said central conductor, a pair of overload fuses, a load break switch mounted within said casing on a sidewall thereof and immersed in said fluid and including an insulating support member, a pair of stationary contacts mounted in spaced apart relation on said support member, a contact movable into first and second positions in engagement with said stationary contacts and to a third position between said stationary contacts, an operating shaft connected to said movable contact and extending through said casing sidewall, arcing contact means pivotally mounted on said movable contact and adapted to latch a stationary contact when said movable contact is actuated into engagement therewith and to remain so latched until said movable contact has traveled a predetermined distance away from said stationary contact, spring means for resiliently urging said arcing contact means toward said movable contact, and means for releasably mounting said pair of overload fuses immersed in said fluid in a position wherein they are accessible through said hand hole and for electrically connecting said overload fuses together at one end; said movable contact and the junction of said overload fuses constituting terminals for said switch and one of said terminals being connected to said current limiting fuse and the other being connected to said primary winding, said switch being adapted to interrupt exciting and approximately 30 times 100 percent load current to said primary winding and said current limiting fuse being capable of interrupting short circuit current of the circuit including said primary winding and of limiting the current to a magnitude smaller than the available short circuit current of said circuit, said overload fuses having a low melting temperature element fusible in response to $I^2R$ heating caused by overcurrents between approximately 3 and 30 times said 100 percent load current and also being fusible in response to I²R heating and overheating of said insulating fluid caused by long duration incipient fault currents of less than approximately 3 times said 100 percent load current.

6. A protected electrical distribution transformer comprising, in combination, a hollow casing, insulating dielectric fluid within said casing, a core and coil assembly including a magnetic core linked by transformer primary and secondary windings immersed in said fluid within said casing, a primary insulating bushing on said casing having a central conductor, a current limiting fuse mounted within said casing and being electrically connected at one end to said central conductor, a pair of overload fuses electrically joined together at one end and immersed in said insulating fluid within said casing, and means for selectively connecting said overload fuses between said current limiting fuse and said primary winding including a load brake switch immersed in said insulating fluid within said casing and having a pair of stationary contacts, each of which is connected to the other end of one of said overload fuses, a movable contact adapted to alternately engage said stationary contacts, and an operating member for said movable contact extending through a wall of said casing and permitting operation of said switch from the exterior of said casing; said load break switch being capable of interrupting exciting and 100 percent load current to said primary winding and said current limiting fuse being capable of interrupting short circuit current of the circuit including said primary winding and of limiting the current to a magnitude smaller than the available short circuit current of said circuit, whereby operation of said switch, subsequent to disconnection of said primary winding by one of said fuses, indicates whether an outage of said transformer was caused by overload or short circuit.

7. A protected electrical distribution transformer comprising, in combination, a hollow casing, insulating dielectric fluid within said casing, a core and coil assembly including a magnetic core linked by transformer primary and secondary windings immersed in said fluid within said casing, a primary insulating bushing on said casing having a central conductor and an axial bore therein, a current limiting fuse within said axial bore and being electrically connected at one end to said central conductor, a pair of overload fuses electrically joined together at one end and immersed in said insulating fluid within said casing, and means for selectively connecting said overload fuses between said current limiting fuse and said primary winding including a load brake switch immersed in said insulating fluid within said casing and having a pair of stationary contacts, each of which is connected to the other end of one of said overload fuses, a movable contact adapted to alternately engage said stationary contacts, and an operating member for said movable contact extending through a wall of said casing and permitting operation of said switch from the exterior of said casing; said load break switch being capable of interrupting exciting and 100 percent load current to said primary winding and said current limiting fuse being capable of interrupting short circuit current of the circuit including said primary winding and of limiting the current to a magnitude smaller than the available short circuit current of said circuit and being adapted to rupture within less than five seconds on high amperage, short circuit currents greater than approximately 30 times 100 percent load current on said primary winding, each of said overload fuses having a low melting temperature element fusible in a time greater than five seconds in response to I²R heating caused by overload currents of a magnitude between approximately 3 and 30 times said 100 percent load current and also being fusible in response to I²R heating and overheating of said insulating fluid caused by incipient fault current of greater than ten minute duration and less than approximately 3 times said 100 percent load current.

8. A protected electrical distribution transformer comprising, in combination, a hollow casing, insulating dielectric fluid within said casing, a transformer core and coil assembly including a magnetic core linked by primary and secondary windings immersed in said fluid within said casing, a primary insulating bushing on said casing having a central conductor and an axial bore opening into the interior of said casing, a primary current limiting fuse releasably mounted within said bore and electrically connected at one end to said central conductor, a pair of overload fuses immersed in said fluid within said casing, a switch immersed in said fluid within said casing and having input and output terminals one of which is connected to said current limiting fuse and the other of which is connected to said primary winding, a pair of stationary contacts, a movable contact adapted to alternately engage said stationary contacts, an operating member for said movable contact extending through a wall of said casing and permitting operation of said switch from the exterior of said casing, a pair of means for detachably mounting each of said overload fuses between one of said terminals and one of said stationary contacts, and means including resiliently biased arcing contact means pivotally mounted on said movable contact and adapted to latch said stationary contacts and remain in engagement therewith until said movable contact has traveled a predetermined distance away therefrom for breaking exciting and load current to said primary winding and said switch being capable of interrupting approximately 30 times 100 percent load current to said primary winding; said current limiting fuse being adapted to interrupt short circuit current of the circuit including said primary winding and to limit the current to a magnitude smaller than the available fault current of said circuit.

9. A protected electrical distribution transformer comprising, in combination, a hollow casing having a hand hole therein permitting access to the interior of said casing, means including a detachable cover for sealing said hand hole, insulating dielectric fluid within said casing, a core and coil assembly including a magnetic core linked by transformer primary and secondary windings immersed in said fluid within said casing, an insulating bushing on said casing having a central conductor and an axial bore opening into the interior of said casing, a primary current limiting fuse within said axial bore electrically connected at one end to said central conductor, a primary overload fuse immersed in said fluid within said casing, means within said casing accessible through said hand hole for releasably mounting said primary overload fuse immersed in said fluid and including a pair of spaced apart terminals adapted to be electrically connected by said overload fuse, a load break switch immersed in said fluid within said casing and having an operating member extending through a wall of said casing permitting operation of said switch from the exterior of said casing, said load break switch being connected in series with said current limiting fuse and said pair of terminals and said primary winding and being capable of interrupting exciting current and 100 percent load current on said primary winding, said current limiting fuse being adapted to interrupt short circuit current of the circuit including said primary winding and to limit the current to a magnitude smaller than the available short circuit current of said circuit.

10. A protected electrical distribution transformer comprising, in combination, a hollow casing, insulating dielectric fluid within said casing, a core and coil assembly including a magnetic core linked by transformer primary and secondary windings immersed in said fluid within said casing, a primary insulating bushing on said casing having a central conductor and an axial bore therein, a current limiting fuse within said axial bore connected at one end to said central conductor, a load break switch immersed in said fluid within said casing and having an operating member extending through a wall of said casing permitting operation of said switch from exterior of said casing, said load break switch being connected in series with said current limiting fuse and said primary winding and being capable of interrupting exciting current and 100 percent load current on said primary winding, said current limiting fuse being capable of interrupting short circuit current of the circuit including said primary winding and to limit the current to a magnitude smaller than the available short circuit current of said circuit and being adapted to rupture within less than five seconds on high amperage short circuit currents greater than approximately 30 times 100 percent load current on said primary winding.

11. In a protected electrical distribution transformer, a hollow casing having an opening in a sidewall thereof, insulating dielectric fluid within said casing, a transformer core and coil assembly including a magnetic core linked by primary and secondary windings immersed in said fluid within said casing, a primary insulating bushing on said casing having an axial conductor and an axial bore therein, a current limiting fuse within said bore and being electrically connected to said conductor, a three position electrical switch immersed in said fluid within said casing including a hub disposed against the interior surface of said casing sidewall and having a smaller diameter threaded portion protruding through said opening in said sidewall and also having an axial bore, means including a nut engaging said threaded portion exterior of said casing for mounting said switch on said sidewall and hermetically sealing between said hub and said sidewall, an arcuate insulating support member affixed to said hub, a pair of stationary contacts mounted on said support member in peripherally spaced apart relation, a first terminal on said support member disposed between said stationary contacts, a plurality of clip connectors one of which is affixed to each stationary contact and two of which are affixed to said first terminal, a switch operating shaft extending through said bore in said hub and having an insulating portion intermediate its ends, a movable contact carried adjacent the end of said shaft within said casing and being rotatable therewith into first and second positions in engagement with individual stationary contacts and to a third position between said stationary contacts, arcing contact means pivotally mounted on said movable contact and having a portion adapted to latch onto a stationary contact when said movable contact is actuated into engagement therewith, spring means for resiliently urging said arcing contact means toward said movable contact, said arcing contact means being latched in engagement with said stationary contact until after said movable contact is disengaged therefrom and being released only after said movable contact has traveled a predetermined distance from said stationary contact, a second terminal electrically connected to said movable contact, one of said terminals being connected to one end of said current limiting fuse and the other being connected to one end of said primary winding, and a pair of overload fuses each of which is immersed in said fluid within said casing and detachably mounted in a pair of said clip connectors one of which is on said first terminal and the other of which is on one of said stationary contacts.

12. In a protected electrical distribution transformer, a hollow casing having a hand hole therein, insulating dielectric fluid within said casing, a core and coil assembly including a magnetic core linked by transformer primary and secondary windings immersed in said fluid within said casing, a primary insulating bushing on said casing having a central conductor, a current limiting fuse within said casing affixed at one end to said central conductor, a pair of overload fuses electrically joined together and immersed in said fluid within said casing, interrupting means including three position switch means within said casing for selectively connecting individual overload fuses between said current limiting fuse and said primary winding and for opening the circuit between said current limiting fuse and said primary winding, said switch means including an insulating support member, a pair of stationary contacts mounted in spaced apart relation on said support member, a rotatable switch operating shaft extending through a wall of said casing and being accessible from the exterior of said casing, a movable contact on said shaft rotatable therewith into first and second positions in engagement with individual stationary contacts and to a third position separated from said stationary contacts, and arcing contacts means resiliently biased toward said movable contact and adapted to latch the stationary contact when said movable contact is actuated to said first and second positions and to disengage said stationary contact only after said movable contact has separated a predetermined distance therefrom; said junction of said overload fuses and said movable contact constituting first and second terminals, respectively, for said interrupting means and said terminals being connected between said current limiting fuse and said primary winding, and means for releasably mounting each of said overload fuses in a position immersed in said fluid within said casing wherein it is accessible through said hand hole and electrically connected between said first terminal and one of said stationary contacts.

References Cited by the Examiner
UNITED STATES PATENTS

| | | | |
|---|---|---|---|
| 3,178,613 | 4/1965 | Dornbush et al. | 317—15 |
| 3,210,604 | 10/1965 | Nelson | 317—15 |

MILTON O. HIRSHFIELD, *Primary Examiner.*

J. L. TRAMMELL, *Assistant Examiner.*